United States Patent [19]

Hartford et al.

[11] Patent Number: 5,112,162
[45] Date of Patent: May 12, 1992

[54] THREAD MILLING CUTTER ASSEMBLY

[75] Inventors: James T. Hartford, Prairie View; Laszlo Frecska, Highland Park, both of Ill.

[73] Assignee: Advent Tool and Manufacturing, Inc., Mundelein, Ill.

[21] Appl. No.: 630,827

[22] Filed: Dec. 20, 1990

[51] Int. Cl.⁵ .............................................. B23G 5/06
[52] U.S. Cl. ..................................... 407/49; 408/215; 470/71
[58] Field of Search .......................... 407/41, 49, 108; 10/141 R; 408/215, 222, 231, 233, 713

[56] References Cited

U.S. PATENT DOCUMENTS 4,009,742  3/1977  Ziegelmeyer .......................... 407/49

FOREIGN PATENT DOCUMENTS 228482  3/1969  U.S.S.R. ................................. 407/49
428117  5/1935  United Kingdom ................... 407/41

Primary Examiner—Daniel W. Howell
Attorney, Agent, or Firm—Charles F. Meroni, Jr.

[57] ABSTRACT

A cutting tool comprised of tool hardened steel having a holder end and an opposite end. A series of axially extending slots are provided on the tool at an outer circumference of the opposite end. The slots each have a radially extending slot wall positioned so as to extend in a plane that intersects a longitudinal axis of the opposite end. Each of the slots also have a generally radially and diagonally extending slot wall confronting the radially extending slot wall associated therewith. Jig ground pins mounted in the opposite end and extended across a radially inner end of the associated slot. A series of cutter bits are mounted in the slots and bottomed on the jig ground pins positioned at the radially inner end of the associated slot. A series of cutter bits with one of the bits in each of the said slots. A series of wedge shaped shims each being mounted in an associated one of the slots and physically positioned in engagement with and between the radially and diagonally extending slot wall associated therewith and one of the cutter bits. Screws are screwed into the opposite end of the tool and which bear against the shims locking the shims and the blades in the slots in unitary assembly therewith.

20 Claims, 2 Drawing Sheets

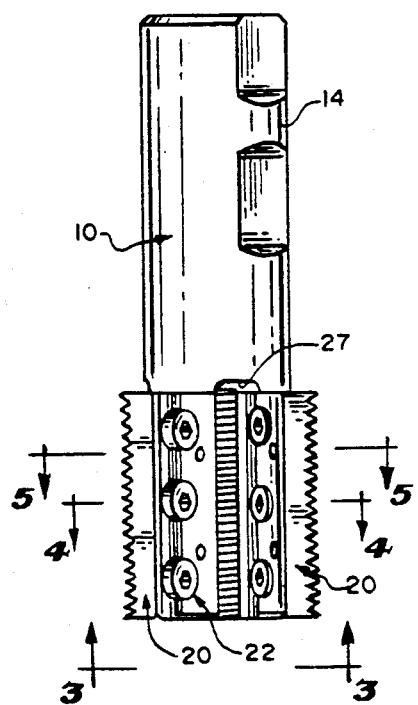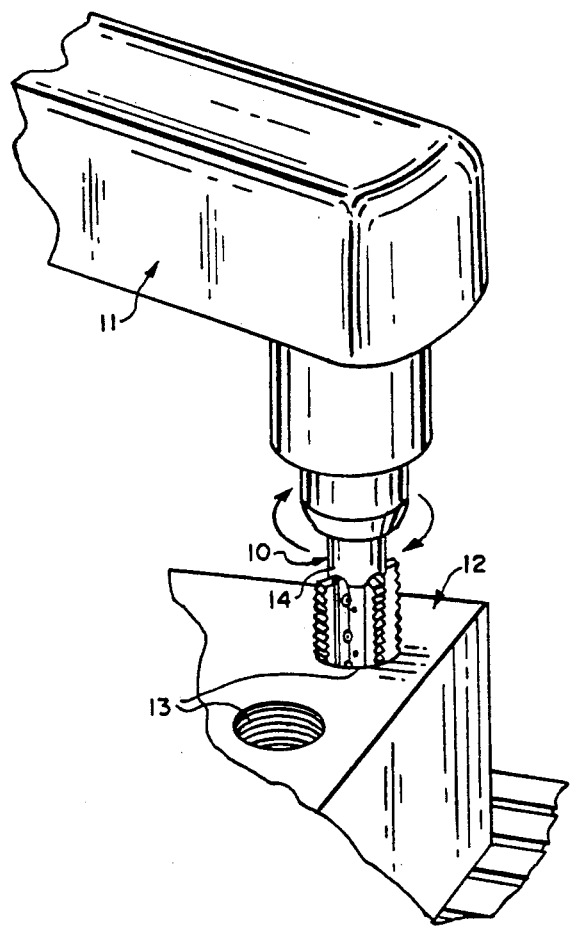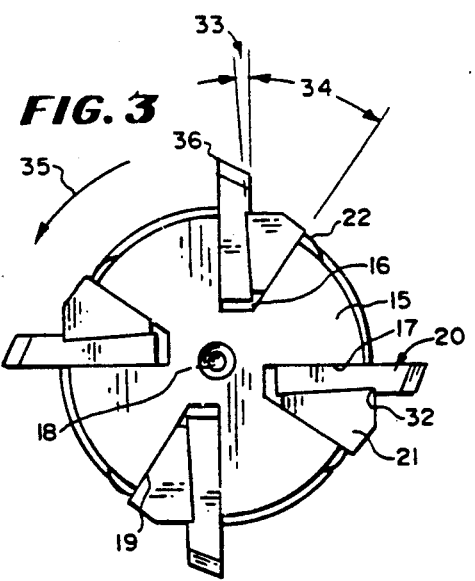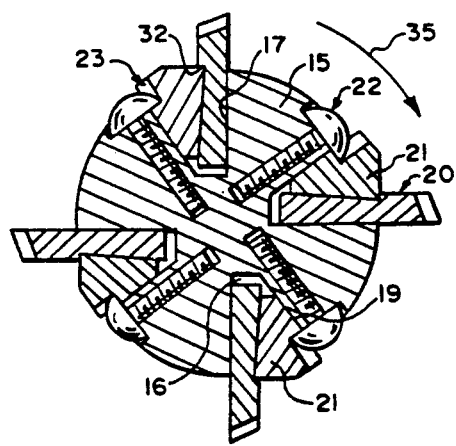

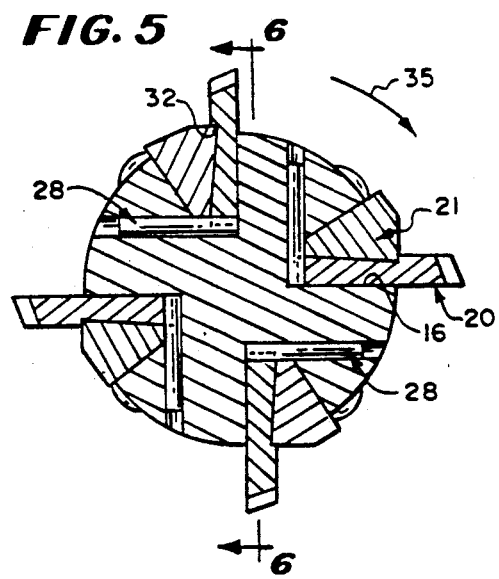
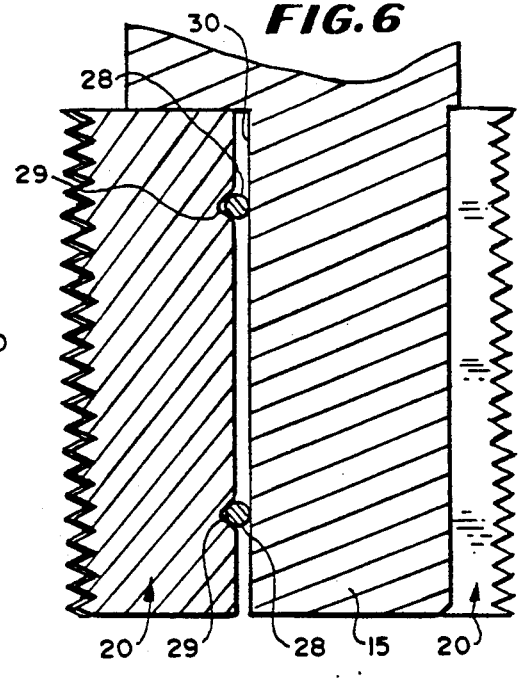
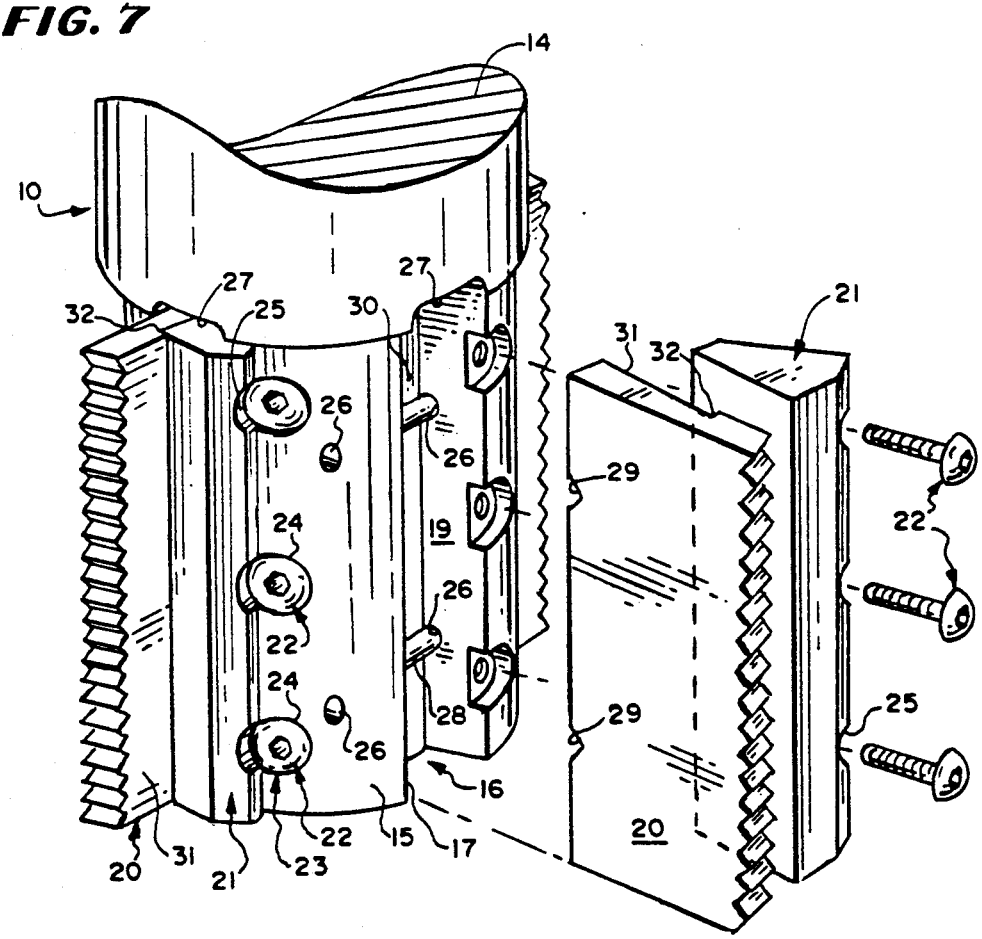

THREAD MILLING CUTTER ASSEMBLY

BACKGROUND OF THE INVENTION

Field of the invention

The invention herein disclosed relates broadly to a new and improved thread milling cutter assembly where worn out carbide blades can be readily replaced with new replacement blades to avoid the expense of replacing the entire tool so as to minimize replacement costs.

As another feature, the holder is uniquely configurated to enable blades to be securely attached to a blade or tool holder in such a manner so as to allow screw threads to be milled in a very accurate manner.

According to more specific features of our invention, we have developed a new carbide tool where we are now able to change the thread form at the machine site and still maintain the accuracy needed to produce a quality thread. The user is also able to replace worn or broken blades very easily, because of our new and improved construction of the holder. The leading edge of the tool is cut in or machined under extreme accuracy so as to maintain lateral and central positioning for locating the vertical and also for locating the serrations.

According to our invention, it is important that a proper relationship be maintained between the blades and the serrations, and to maintain proper diameter through the use of jig ground pins. These pins are put in under high accuracy in relationship to the centerline of the tool and also the centerline of the pins. The location from the bottom edge of the tool and the centerline of the leading pin is also maintained under extreme accuracy for blade location.

Now for the carbide blade, two 45 degree slots are form ground at one time to insure location of centerline points of cutting blade and its cutting edge or serrations or V. Then a 2 degree back taper is ground on the back side of the carbide blade. The back taper enables the wedge to hold the blade down on the pins. From that point the blade serrations or cutting edges are then ground off of 45 degree grooves or V-shaped notches to insure proper location height of the cutting edges. After the blade is put into the holder and is rested on the pins, a wedge is installed.

The wedge is ground as to put pressure against the carbide blade in two ways. The first way is to hold the bit or blade against the leading edge of the holder which is very crucial. The second way is designed to hold the blade down on the pins, and this is done with a 2 degree front taper on the wedge, and a 30 degree back taper pushes the tool forward against the leading edge. This is all held together by three 0.160" diameter screws which put and maintain pressure against the wedge. To change the blade, you merely loosen the three screws and slide the blade on the bottom and reverse the process to install new blades. All the blades may be purchased at a fraction of the cost of a new tool with no difference in quality of tooling. Also, our new construction enables the user to change thread pitches just by changing the blades. The tool can be utilized in setups for vertical or horizontal machining centers.

SUMMARY OF THE INVENTION

Our invention concerns a cutting tool comprised of tool hardened steel having a holder end and an opposite end, a series of axially extending slots at an outer circumference of said opposite end, the slots each having a radially extending slot wall positioned so as to extend in a plane that intersects a longitudinal axis of the opposite end, each of the slots also having a generally radially and diagonally extending slot wall confronting the radially extending slot wall associated therewith, jig ground pins mounted in the opposite end and extended across a radially inner end of the associated slot, a series of cutter bits with one of the bits in each of the slots, a series of cutter bits mounted in the slots and bottomed on said jig ground pins positioned at the radially inner end of the associated slot, a series of wedge shaped shims each being mounted in an associated one of the slots and physically positioned in engagement with and between the radially and diagonally extending slot wall associated therewith and one of the cutter bits for asserting pressure against the bits to hold the bits against leading sides of the slots, and screws screwed into the opposite end of the tool and which bear against the shims locking the shims and the blades in the slots in unitary assembly therewith.

Other features of our invention concern the opposite end of the tool having a series of axially spaced holes at an outer circumference of the opposite end which holes are formed in part in the opposite end and also in the shim, the holes each being adapted to receive one of the screws so that the associated shim can be wedged against the associated cutter bit when threaded in place.

Still further features of our invention relate to the tool being provided with slots each having a length in excess of a length of the cutter bit for receipt of the bit in the slot, the slots extending axially into the holder end, each of said bits having a radially inwardly facing shoulder said shim having one corner held in abutment beneath the shoulder by the bit and the threaded pin to provide a support for the cutter bit.

Yet still further features of our invention concern a new and improved cutting tool where each bit has a series of arcuately shaped hole portions extending along one side of the wedge-shaped shims for receipt of heads of the screws for locking the shims against axial and radial movement relative to the opposite end.

Other features of our invention relate to a cutting tool comprised of tool hardened steel having a holder end and an opposite end, a series of radially outwardly opening axially extending wedge shaped slots at an outer circumference of the opposite end, the slots each including inwardly converging forward and rearward slot walls, jig ground pins mounted in the opposite end and each extended across a radially inner end of the associated slot, a series of cutter bits mounted in the slots and bottomed on the jig ground pins positioned at the radially inner end of the associated slot and being engaged against the forward slot wall, a series of wedge shaped shims each being mounted in an associated one of slots and physically positioned in engagement between the rearward slot wall and one of the cutter bits, and screws screwed into the opposite end of the tool and which bear against the shims locking the shims and the blades in the slots in unitary assembly therewith so that the blade is firmly bottomed upon the associated jig ground pin.

BRIEF DESCRIPTION OF THE DRAWINGS

FIG. 1 is an enlarged fragmentary perspective view of a machine having our thread milling cutter assembly mounted thereon showing the way that it operates to mill a threaded hole in a metal block;

FIG. 2 is an enlarged side elevation of the thread milling cutter assembly shown in FIG. 1;

FIG. 3 is an enlarged bottom end view of our thread milling cutter assembly viewed on the lines 3—3 looking in the direction indicated by the arrows as seen in FIG. 2;

FIG. 4 is an enlarged vertical section with parts shown in elevation as seen in FIG. 2 on the line 4—4 looking in the direction indicated by the arrows;

FIG. 5 is an enlarged cross sectional view with parts in elevation as seen on the line 5—5 looking in the direction indicated by the arrows as depicted in FIG. 2;

FIG. 6 is a vertical section taken on the line 6—6 looking in the direction indicated by the arrows as seen in FIG. 5; and FIG. 7 is an enlarged fragmentary exploded view of our thread milling cutter assembly showing the way in which the components can be assembled.

DESCRIPTION OF THE PREFERRED EMBODIMENTS

The reference numeral 10 indicates generally our new and improved thread milling cutter assembly or tool. The tool 10 is adapted to be used on a milling machine 11 as shown in FIG. 1 for grinding a metal block 12 so as to provide threaded holes 13 in the block.

The tool 10 has a tool holder end or shank 14 and an opposite end 15. Axially extended slots (FIG. 7) are provided in the opposite end 15 as will be observed from FIGS. 2, 3 and 4. Four of these slots 16 are provided in the illustrated embodiment. A pair of the slots 16 are form ground at 45 degree angles at one time to ensure location of the center line points. The slots each include a radially extending slot wall 17 which is so positioned as to be in radial alignment with a horizontal axis (FIG. 3) extended along the length of the tool 10. The slots 16 are also each provided with a diagonally extending slot wall which is also positioned for inner section with the horizontal axes 18 of the tool at its inner end.

Serrated thread milling cutter bits or blades 20 each having sharp cutting edges as shown in FIG. 7 are provided for mounted disposition in the slots 16. These blades 20 are preferably made of a carbide steel for long wear. Four of the blades are provided for the preferred form of tool 10, and each of the blades is adapted to be received and held in the one of the slots 16 as will hereafter be further described.

Cooperable with the blades 20 in the slots 16 are a series of V-shaped or wedge-shaped shims 21. Cooperable with the opposite end 15 and the shims 21 are a series of threaded pins or machine screws 22. In the preferred embodiment illustrated in the drawings of our tool 10, it will be noted that we have utilized three machine screws 22 for each of the cutter bits or blades 20. Each of the screws 22 are extended in a line extending parallel to a 30 degree rearward line of the shims 21 (FIGS. 3 and 4).

In order to assist if firmly anchoring the blades in place on the tool 10, and more particularly on the opposite end of the tool 15, axially spaced holes 23 are provided. Each of the holes 23 include a part or portion of the hole in opposite end 15 as indicated at 24 and also include a part or portion of the hole 23 in the shim 21 as indicated at 25. The portions 24 and 25 are arcuately shaped, and are inset into the opposite end 15 and into the shim 21 so that a head end of the screws 22 essentially falls within the outer circumference of the opposite end as shown in FIG. 4. By locating the pin head in the inset hole 23, the milling operation can be carried out in such a way that the heads of the screws will not interfere with the machining operation.

Vertically spaced pin holes 26 are positioned in a side slot hole 17 at one side of each of the axially extending slots 16 beneath the elongated U-shaped grooves 27 in the shank 14. The grooves 27 extend or face in an axially downwardly extending direction so that upper ends of the bit or blade 20 and the shim 21 can be positioned beneath the associated groove 27. Dowl pins or jig ground pins 28 are engaged in the pin holes 26 and are pushed so as to extend transversely across the slots 16. Each pin 28 is engaged in one of the holes 26 and has sufficient pin length left in the hole 26 so that its position is firmly implanted against axial movement once its position has been established so that an end of the pin 28 underlies the notch of the bit to support the bit as previously described. V-shaped blade notches 29 (FIG. 6) are carefully machined in the bit 20 with reference to the jig ground pins 28 so that when the bit or blade 20 is properly positioned within the associated slot 16, the bit or blade 20 will be engaged with the pin 28 in bottomed relation. It will further be seen in FIG. 6 that the pins are also backed up and engaged against a rear slot wall 30.

The bits or blades 20 are each undercut where a 2 degree taper 33 is cut into a blade side wall 31 to form a locking blade shoulder 32 (FIG. 7).

As stated previously, it is important that a proper relationship be maintained between the blades 20 and the serrations, and to maintain proper diameter through the use of the jig ground pins 28. These pins are put in under high accuracy in relation to a center line of the tool and also a center line of the pins. The location from a bottom edge of the tool and the center line of the leading pin is also maintained under extreme accuracy for blade location. Now for the carbide blade 20, the two 45 degree slots are formed at one time to insure location of center line points. Then a 1 degree back taper is ground on the back side of the carbide blade. The back taper enables the wedge to hold the blade down on the pins. From that point the blade serrations or cutting edges are then ground off of 45 degree grooves or V-shaped notches to insure proper location height of the cutting edges. After the blade is put into the holder and is rested on the pins, a wedge is installed.

The wedge is ground as to put pressure against the carbide blade in two ways. The first way is to hold the bit or blade against the leading edge of the holder which is very crucial. The second way is designed to hold the blade down on the pins, and this is done with a 2 degree front taper on the wedge, and a 30 degree back taper on the rear slot wall co-acts with the shim to push the tool forward against the leading edge. This is all held together by three 0.160" diameter screws which put and maintain pressure against the wedge. To change the blade, you merely loosen the three screws and slide the blade on the bottom and reverse the process to install new blades. All the blades may be purchased at a fraction of the cost of a new tool with no difference in quality of tooling. Also, our new construction enables the user to change thread pitches just by changing the blades. The tool can be utilized in setups for vertical or horizontal machining centers.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

We claim:

1. A cutting tool comprised of tool hardened steel having a holder end and an opposite end, a series of axially extending slots at an outer circumference of said opposite end, said slots each having a radially extending slot wall positioned so as to extend in a plane that intersects a longitudinal axis of said opposite end, each of said slots also having a generally radially and diagonally extending slot wall confronting said radially extending slot wall associated therewith, jig ground pins mounted in said opposite end and extended across a radially inner end of the associated slot, a series of cutter bits mounted in said slots and bottomed on said jig ground pins positioned at the radially inner end of the associated slot, a series of wedge shaped shims each being mounted in an associated one of said slots and physically positioned in engagement with and between said radially and diagonally extending slot wall associated therewith and one of said cutter bits for asserting pressure against the bits to hold the bits against leading sides of said slots, and screws screwed into said opposite end of the tool and which bear against said shims locking the shims and the blades in said slots in unitary assembly therewith.

2. The cutting tool of claim 1 wherein said opposite end of the tool has a set of axially spaced holes at an outer circumference of the opposite end which holes are formed in part in the opposite end and also in the shim, the holes each being adapted to receive one of said screws so that the associated shim can be wedged against the associated cutter bit when threaded in place.

3. The cutting tool of claim 1 wherein each of said slots has a length in excess of a length of the cutter bit for receipt of the bit in said slot, the slots extending axially into said holder end, each of said bits having a radially inwardly facing shoulder, said shim having one corner held in abutment beneath the shoulder by said bit and said threaded pin to provide a support for the cutter bit.

4. The tool of claim 1 wherein each bit has a series of arcuately shaped hole portions extending along one side of an associated one of the wedge-shaped shims for receipt of heads of the screws for locking the shims against axial and radial movement relative to said opposite end.

5. The tool of claim 1 wherein said cutter bits each having a 2 degree taper on a rearward side, said 2 degree taper terminating at its radially outer end in a bit shoulder, said shim having a forward side shim surface tapered and nested against said bit side, a radially outer shim surface being engaged radially behind said bit shoulder, said shim having a 30 degree back taper which provides means pushing the bit forward against the leading side of the slot.

6. The tool of claim 1 wherein said shim provides means to put pressure against said cutter bits in two ways by (1) holding the bit against a leading side of said slot and (2) by holding the bit down on said pins.

7. The tool of claim 6 wherein said means includes a 2 degree front taper on said shim and a 30 degree back taper pushing the cutter bit forward against the leading side of said slot.

8. The tool of claim 1 wherein said cutter bits each having cutting teeth at radially outer ends, said bits each being provided with vertically spaced V-shaped notches on its radially inner edge, the notches being positioned for engagement with outer surfaces of said jig ground pins for properly positioning said cutting teeth on the blades in proper relation to one another for cutting screw threads.

9. A cutting tool comprised of tool hardened steel having a holder end and an opposite end, a series of axially extending slots at an outer circumference of said opposite end, said slots each having a radially extending slot wall positioned so as to extend in a plane that intersects a longitudinal axis of said opposite end, each of said slots also having a generally radially and diagonally extending slot wall confronting said radially extending slot wall associated therewith, jig ground pins mounted in said opposite end and extended across a radially inner end of the associated slot, a series of cutter bits mounted in said slots and bottomed on said jig ground pins positioned at the radially inner end of the associated slot, a series of wedge shaped shims each being mounted in an associated one of said slots and physically positioned in engagement with and between said radially and diagonally extending slot wall associated therewith and one of said cutter bits, and screws screwed into said opposite end of the tool and which bear against said shims locking the shims and the blades in said slots in unitary assembly therewith, said opposite end of the tool has a set of axially spaced holes at an outer circumference of the opposite end which holes are formed in part in the opposite end and also in the shim, the holes each being adapted to receive one of said screws so that the associated shim can be wedged against the associated cutter bit when threaded in place.

10. The cutting tool of claim 9 wherein each of said slots has a length in excess of a length of the cutter bit for receipt of the bit in said slot, the slots extending axially into said holder end, each of said bits having a radially inwardly facing shoulder, said shim having one corner held in abutment beneath the shoulder by said bit and said threaded pin to provide a support for the cutter bit.

11. The tool of claim 9 wherein each bit has a series of arcuately shaped hole portions extending along one side of an associated one of the wedge-shaped shims for receipt of heads of the screws for locking the shims against axial and radial movement relative to said opposite end.

12. The tool of claim 9 wherein said cutter bits each has a 2 degree taper on a rearward side, said 2 degree taper terminating at its radially outer end in a bit shoulder, said shim having a forward side shim surface tapered and nested against said bit side, a radially outer shim surface being engaged radially behind said bit shoulder, said shim having a 30 degree back taper which provides means pushing the bit forward against the leading side of the slot.

13. A cutting tool comprised of tool hardened steel having a holder end and an opposite end, a series of radially outwardly opening axially extending wedge shaped slots at an outer circumference of said opposite end, said slots each including inwardly converging forward and rearward slot walls, jig ground pins mounted in said opposite end and each extended across a radially inner end of the associated slot, a series of cutter bits mounted in said slots and bottomed on said jig ground pins positioned at the radially inner end of the associated slot and being engaged against said forward slot wall, a series of wedge shaped shims each being mounted in an associated one of said slots and physically positioned in engagement between said rearward slot wall and one of said cutter bits, and screws screwed into said opposite end of the tool and which bear against said shims locking the shims and the blades in said slots in unitary assembly therewith so that said blade is firmly bottomed upon the associated jig ground pin.

14. The cutting tool of claim 13 wherein each of said slots has a length in excess of a length of the cutter bit for receipt of the bit in said slot, the slots extending axially into said holder end, each of said bits having a radially inwardly facing shoulder, said shim having one corner held in abutment beneath the shoulder by said bit and said threaded pin to provide a support for the cutter bit.

15. The tool of claim 13 wherein each bit has a series of arcuately shaped hole portions extending along one side of an associated one of the wedge-shaped shims for receipt of heads of the screws for locking the shims against axial and radial movement relative to said opposite end.

16. The tool of claim 13 wherein said cutter bits each having a 2 degree taper on a rearward side, said 2 degree taper terminating at its radially outer end in a bit shoulder, said shim having a forward side shim surface tapered and nested against said bit side, a radially outer shim surface being engaged radially behind said bit shoulder, said shim having a 30 degree back taper which provides means pushing the bit forward against the leading side of the slot.

17. The tool of claim 13 wherein said shim provides means to put pressure against said cutter bits in two ways by (1) holding the bit against a leading side of said slot and (2) by holding the bit down on said pins.

18. The tool of claim 17 wherein said means includes a 2 degree front taper on said shim and a 30 degree back taper on said rearward slot wall pushing the cutter bit forward against the leading side of said slot.

19. The tool of claim 18 wherein said cutter bits each having cutting teeth at radially outer ends, said bits each being provided with vertically spaced V-shaped notches on its radially inner edge, the notches being positioned for engagement with outer surfaces of said jig ground pins for properly positioning said cutting teeth on the blades in proper relation to one another for cutting screw threads.

20. The tool of claim 13 wherein said cutter bits each has a 2 degree taper on a rearward side, said 2 degree taper terminating at its radially outer end in a bit shoulder, said rear wall of each of said slots having a forward side shim surface tapered and nested against said bit side, a radially outer shim surface being engaged radially behind said bit shoulder, said shim having a 30 degree back taper which provides means pushing the cutting bit forward against the leading slot wall of the slot to insure that the bit is fixedly held against said leading slot wall.

* * * * *